FIG. 1

DOUGLAS J. BRIDGEFORD
*INVENTOR.*

BY David V. Munnis
Neil J. Mosely
his attorney

FIG. 2

United States Patent Office 3,557,082
Patented Jan. 19, 1971

3,557,082
PROCESS FOR SEPARATING IONIC MATERIALS FROM COMPONENT MIXTURES
Douglas J. Bridgeford, Danville, Ill., assignor to Tee-Pak, Inc., a corporation of Illinois
Filed Jan. 24, 1969, Ser. No. 793,773
Int. Cl. B01d 11/00, 15/04; C08b 9/00
U.S. Cl. 260—218　　　　　　　　　　　　　　35 Claims

ABSTRACT OF THE DISCLOSURE

Ionic material is separated from a component mixture containing same, e.g. a crude alkali cellulose xanthate, by contacting the component mixture with a liquid solvent to dissolve ionic material, preferably providing a mixture autogenously separable into two phases, one being the liquid solvent containing separated ionic material and the other, the non-dissolved residue of the component mixture, ionic material is insolubilized and removed from the liquid solvent by contacting the liquid solvent separately with an immiscible ion-exchange medium (e.g. anion-exchange resins, cation-exchange resins, ion retardation resins, or ion-exchange liquids) and resultant ion-exchanged liquid solvent is re-used in the process for separating ionic material from additional efficiently purifying materials which are sensitive to component mixture. Ionic material may be separated from component mixtures comprising gases, liquids, semi-solids, and solids by the process of the present method. Advantageous features of the process include a widening of the conditions and scale of operations in which solvents economically can be used for separations. Additionally, the process provides a novel route for more certain solvents, heat, acids and/or alkalis and/or contain relatively low ionic material contaminant levels. Other features stem from an ability to utilize preferred purification expedients, e.g. high boiling solvents, heretofore often economically non-feasible. The process is especially useful for purifying polymeric alcohol xanthates, and in particular advantageously can be employed to provide improved solid alkali cellulose xanthate directly from alkali cellulose xanthate crumb.

DISCLOSURE OF THE INVENTION

Cellulose can be formed into shaped articles (e.g. filaments, films, and tubes) or used as a coating and impregnating material in the manufacture of paper products and fabrics. Since it is relatively insoluble, cellulose generally is preliminarily derivatized to a more soluble form prior to shaping or deposition. It is typical, for example, to convert cellulose to the xanthate derivative in order to provide a more readily usable form of the material. Commercially, alkali cellulose xanthate is produced by treating cellulose fiber with a strong aqueous alkali to provide an alkaline cellulose composition having a desired molecular weight and then tumbling the moist alkali cellulose in an atmosphere of carbon disulfide vapor to introduce xanthate constituents. The cellulose material obtained thereby is an orange-colored fluffy particulate solid and constitutes what is commonly referred to as "cellulose xanthate crumb."

Ideally, cellulose xanthate in the crumb form would be the material to be directly offered for sale or directly utilized in the preparation of shaped, deposited, or impregnated cellulose products. The material, as commonly produced, however, rapidly decomposes even at reduced temperatures. Crude crumb, hence cannot be suitably extruded and storage of it is difficult. When dissolved in aqueous alkaline solutions, however, the xanthated material readily is extrudable. Consequently, alkali cellulose xanthate typically is converted from the "crumb" form into the aqueous alkaline solution form the latter being what is commonly referred to as "viscose." When produced the viscose simply need be extruded through an appropriate die into an acid bath which coagulates the extruded material and regenerates a cellulose article corresponding in shape to the die.

On the other hand while viscose is extrudable and formable it too suffers several drawbacks. Unfortunately it also decomposes relatively rapidly. This instability practically dictates that viscose be produced only at the actual site of its ultimate usage. Accordingly in certain areas and in particular in applications in the paper and fabric impregnation field, viscose has not and apparently cannot satisfy the apparent market potential or regenerated cellulose.

Several approaches have been suggested to improve the stability of viscose. One general method, exemplified by the processes disclosed in Bridgeford U.S. Pat. Nos. 3,291,789 and 3,330,820, effects a removal of the residues of the alkalization and xanthation processes characteristically present in viscose by directly contacting the viscose with ion-exchange resins, ion retardation resins, and the like. Such treatments are successful in improving the useful life of viscose. The treated viscose, however, still contains appreciable quantities of water and thus is not an attractive product for shipment to potential customers.

A dry, superficially solid form of alkaline cellulose xanthate also has been suggested. This material, as described in Bridgeford U.S. Pat. No. 3,399,069, constitutes the product obtained by spray drying decausticized viscose. These spray-dried products do exhibit satisfactory storage life and, for use, need only be re-dispersed in water or another suitable solvent to provide alkali cellulose xanthate solutions which can be used in the manner of conventional viscose. Consequently, such material satisfactorily meet the requirements of a fully marketable film-producing cellulose composition.

The spray drying route for producing improved cellulose materials, however, is not totally free of problems. One difficulty stems from the relatively high viscosity of viscose even at low solids contents, e.g. on the order of 4%, dry solids weight basis. Viscosity related problems are further aggravated by the fact that viscose viscosity increases with increasing polymer molecular weight and the higher molecular weight materials often are preferred. Other instances could arise, moreover, where available spray drying capacity could not meet demands. A search, consequently, has continued for alternate methods for providing stable, preferably dry solid forms, of cellulose xanthate. This applies to other film-forming polymeric alcohol xanthates including those of polysaccharides and other polyhydric polymeric materials such as starch, amylose, polyvinyl alcohol, and the like, since these substances have similar properties and hence similar problems obtain with regard to them.

It has been suggested that the ionic, primarily alkaline, impurities characteristically present in conventionally prepared polymeric alcohol xanthates are largely responsible for the instability of the materials. Following this, several alternative approaches have been considered for providing purified products in which the ionic contaminants are neutralized and/or removed. The straight neutralization route, however, did not prove satisfactory since weak acids are too expensive and strong acids, due to the acid-sensitivity of xanthates, undesirably produce non-uniform products containing regions of insolubilized matter. Another previous tack which attempted to remove the ionic impurities involved direct solvent extraction. It likewise, however, generally did not prove totally satisfactory. Methanol and ethanol, the more effective solvents for the primary contaminant present, namely, the alkali employed in the alkalization step e.g. sodium hydroxide) undesirably reacts with and destroys the polymeric xanthate derivative through an alcohol interchange reaction. The use of other less effective solvents also has proven unsuitable due to the operating costs and material losses per unit of contaminant removed which attend conventional solvent extraction and evaporative recovery techniques.

The difficulties encountered in attempting to provide improved polymeric alcohol xanthates, moreover, are by no means limited to this particular class of substances. Indeed, similar and other problems extend to a great many efforts having as their goal the efficient and economic separation, recovery, purification and the like of a wide variety of other substances, including gases, liquids and semi-solids, as well as other solids. Initally, the scale of an operation simply may not justify investment and/or operating expenditures necessary to certain separation techniques. As in the case of polymeric alcohol xanthates, problems often also result due to substances themselves being sensitive or responsive to a certain expendient or condition e.g. strong acid, strong base, solvent, or heat).

In the purification of some substances, the sensitivity may result in sacrificed efficiency but is tolerated as a necessary process liability. For example, in conventional solvent extraction of residual ionic monomers from crude polymers (e.g. caprolactam monomer extraction from polycaprolactam), economics heretofore generally has forced one to employ a solvent which dissolves not only the impurity but a portion of the desired product as well.

Similar problems are encountered in attempts to utilize solvents to remove inorganic and/or organic ionic materials produced as by-products in the production of liquids, gases, semi-solids and solids which themselves are at least partially soluble in the solvents commonly useful to remove the by-products (e.g. soduim chloride extraction from mixed cellulose ether gums containing hydroxyethyl and carboxylmethyl groups).

In other cases, the sensitivity of a product desired to be purified may dictate that the purification treatments be carried on under otherwise totally unacceptable conditions. The heat sensitivities of certain albuminous substances (e.g. collagen and blood) essentially require that any solvent extractions thereof be effected in the cold at temperatures at which conventional solvents have considerably reduced equilibrium solubilities for the salts and other impurities present.

Problems also can result due to the characteristics of the treating agent desired to be employed. A system which solvent performance-wise favors the use of a normally high boiling solvent, such as dimethyl sulfoxide, for example, may be forced to employ lower boiling and less efficient solvents in view of limited allowances in overall process economics for solvent recovery costs. In similar instances effective solvents, e.g. amines, sometimes have to be by-passed due to their being unstable to conditions (e.g. temperature, oxygen-containing atmosphere, etc.) normally encountered in conventional solvent evaporation recovery systems.

Special problems also can stem from the concentration of ionic material being relatively small. The removal of relatively small proportions of ionic contaminants from gases (e.g. the reduction of carbon disulfide concentrations in air from about 50 p.p.m. to levels on the order of 0.1 p.p.m.), for example, is not now justified on the basis of recoverable material value. A tightening of pollution controls, in the future, however, may render it necessary.

Accordingly, it is the primary object of the present invention to provide a novel method for purifying polymeric alcohol xanthates.

Another object of the present invention is to provide a novel method for producing improved cellulose xanthates.

An additional object of the present invention is to provide an improved method for efficiently removing ionic contaminants from cellulose xanthates wherein solvent extraction of impure xanthate crumb is carried out under conditions at which cellulose xanthates are essentially stable.

Still a further object of the present invention is to provide a novel method for producing solid cellulose xanthate of improved stability wherein cellulose xanthate crumb is efficiently solvent extracted to remove impurities using a solvent substantially inert with respect to cellulose xanthate.

Yet another object of the present invention is to provide an improved method for separating ionic impurities form cellulose xanthates wherein neutralization of alkaline contaminants, in effect, can be carried out using strongly acid ion removal agents without undesirable effects to the cellulose xanthates.

An additional object of the present invention is to provide a novel and improved method for separating ionic materials from gaseous, liquid, semi-solid and solid substances generally.

Another object of the present invention is to provide a novel method which entails the use of solvents to separate ionic materials from component mixtures, which is adapted for efficient use in small scale operations and which allows the effectual use of a wide range of conditions heretofore avoided in view of the properties of components in mixtures being treated and/or the characteristics of the available solvents.

Still another object of the present invention is to provide an improved method for separating ionic materials from heat-sensitive materials.

An additional object of the present invention is to provide an improved method involving solvent treatment of substances to separate ionic materials wherein ionic material removal efficiently and economically can be carried out at temperatures significantly lower than those at which the particular solvent employed displays optimum solubility for the ionic materials.

Yet another object of the present invention is to provide an improved method for separating alkaline materials from acid-sensitive materials.

A further object of the present invention is to provide an improved method for separating acidic materials from alkaline-sensitive substances.

It is an additional object of the present invention to provide a more efficient and economical method to separate, by the use of solvents, ionic materials from substances which themselves are soluble in solvents commonly employed for extracting ionic materials.

Another object of the present invention is to provide a method for separating ionic materials from substances by solvent extraction wherein solvents efficiently can be employed which normally have relatively low equilibrium solubilities for the ionic materials.

Still a further object of the present invention is to provide a novel method entailing solvent removal of ionic materials from substances wherein solvent simply can be recovered and efficiently can be re-used in the process without being subjected to an intermediate distillation step.

It is furthermore an object of the present invention to provide an improved method for solvent treating substances to separate ionic materials whereby the utilization of normally high boiling and/or thermally unstable solvents can be rendered mor economically feasible.

Still an additional objct of the present invention is to provide an improved component and separation method whereby small concentrations of ionic materials more efficiently and economically can be removed from component mixtures.

In accordance with one aspect of the present invention, ionic material is separated from alkaline polymeric alcohol xanthates such as alkaline cellulose xanthates by a method comprising (1) Contacting an alkaline polymeric alcohol xanthate with a solvent liquid effective to dissolve at least a portion of ionic material present, (2) Contacting the resultant ionic material-containing solvent liquid with at least one immiscible ion exchange medium to effect separation of at least a portion of the dissolved ionic material from said solvent liquid, and thereafter (3) Contacting additional alkaline polymeric alcohol xanthate with the resultant ion-exchanged solvent liquid.

The phrase, "ionic material," as employed herein will be understood to refer to any inorganic or organic substance capable of forming strong or weak ions when placed in water or another solvent therefor. Such substances include materials which dissociate in the solvent, into ions, i.e. electrolytes, as well as materials which react or interact with the solvent (e.g. in the case of water, substances such as ammonia, metal oxides and organic compounds containing functional groups such as cyano, carbonyl, amino, amido, sulfamide, and the like groups) to yield substances displaying migration in an electrolytic or electrophoretic cell. It will be further understood that the term, "immiscible," as employed herein is intended to indicate that a definite phase boundary exists between substances, e.g. solvent liquid and ion exchange medium, during the time they are in contact with one another. So long as a phase boundary exists, hence, the term includes systems in which significant, little, or no mixing of portions of the contacting substances occurs.

In certain preferred embodiments of the method, above described, the polymeric alcohol xanthate and liquid solvent are at least partially immiscible, the ion exchange medium is either a cation exchange resin in the hydrogen ion form, an anion exchange resin in the salt form, or an ion retardation resin, and/or the ion exchange medium periodically is treated with a regeneration liquid to elute from the medium the ionic material pickd up from the solvent liquid. In particular preferred embodiments of the above-described method, alkaline cellulose xanthate crumb is the alkaline polymeric alcohol xanthate composition being treated.

The present method advantageously provides an alternative and efficient method for separating ionic contaminants from polymeric alcohol xanthates. In the present method the acid-sensitivity of the xanthates is no problem since only a neutral solvent liquid need contact the xanthates. The ion exchange medium, moreover, since it may be removed from the xanthates being treated, advantageously may be strongly acidic. By means of the present method, consequently, the benefits of the use of strongly acidic neutralization agents, e.g. strongly acidic cation exchange resins, can be gained without adverse effects to the quality of the treated xanthates. Properly carried out, as described hereinafter, moreover, the present method allows a relatively large ionic material concentration gradient to be maintained between the impure xanthates being treated and the solvent liquid. This characteristic makes even solvents having low equilibrium solubilities for ionic material efficient in the present process. Solvents such as methanol and ethanol, heretofore conventionally employed for extracting polymeric alcohol xanthates due to their high efficiency for ionic material removal even though undesirably reactive with xanthate product, while useable, may be avoided in the present method with little or no sacrifice to overall ionic material separation efficiency. Especially advantageous is the capability of the present method to provide solid alkaline polymeric alcohol xanthates of improved purity and stability by a direct treatment of crude solid products. Crude alkaline cellulose xanthate crumb, for example, can be purified and given improved storage stability using the present method without the need of preliminarily converting it to viscose in the conventional manner. Hence, equipment and operating costs heretofore requird to obtain a dry cellulose xanthate product may be reduced. Eliminating the viscose intermediate conversion with its attendant viscosity problems has the added advantage of allowing cellulose xanthate products including those having the higher molecular weights (e.g. having degrees of polymerization above about 1200) to be more easily produced. Furthermore, as described more fully below, by means of the method of the invention these and other advantages likewise are extended to ionic material separations from component mixtures generally.

The method of the present invention will be more readily understood from the following description thereof given with reference to the attached drawings of which.

Figure 1:
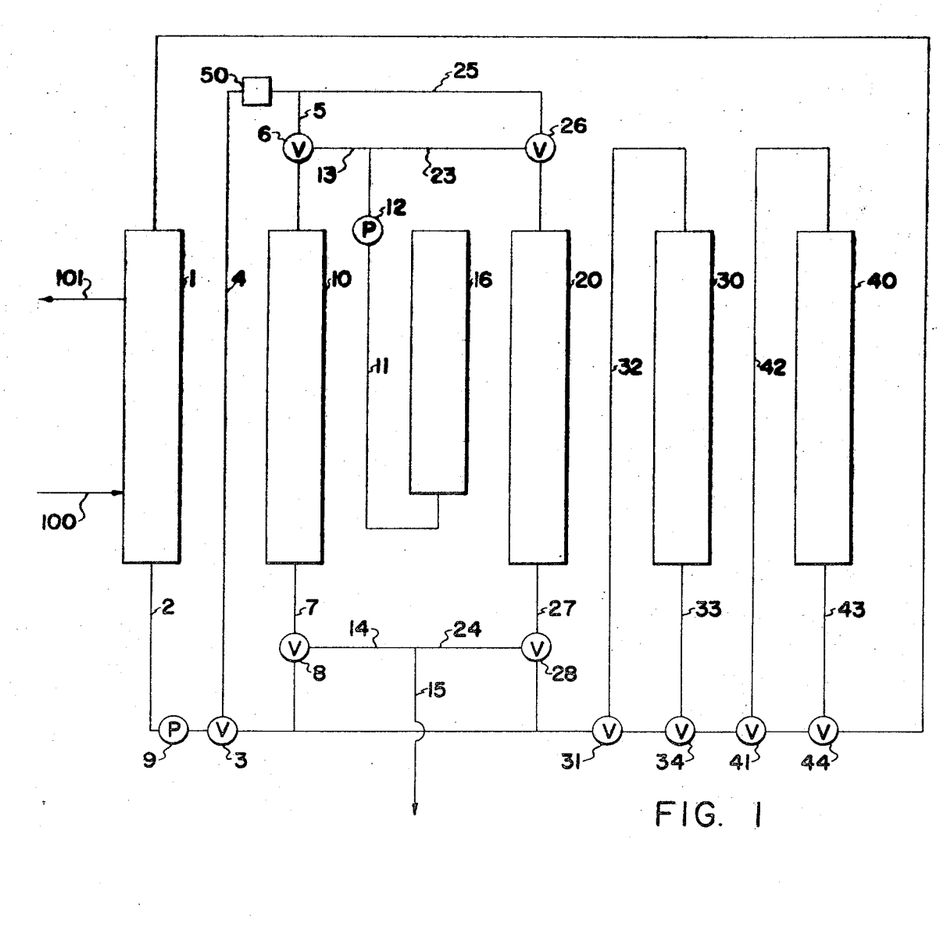
FIG. 1 is a schematic flow diagram of one embodiment of the present method which is adapted for batch, semi-continuous, or continuous operation and wherein solvent liquid being circulated in the system to effect ionic material separation optionally can be given intermediate treatments to preclude buildup in the solvent liquid of extraneous materials.
Figure 2:
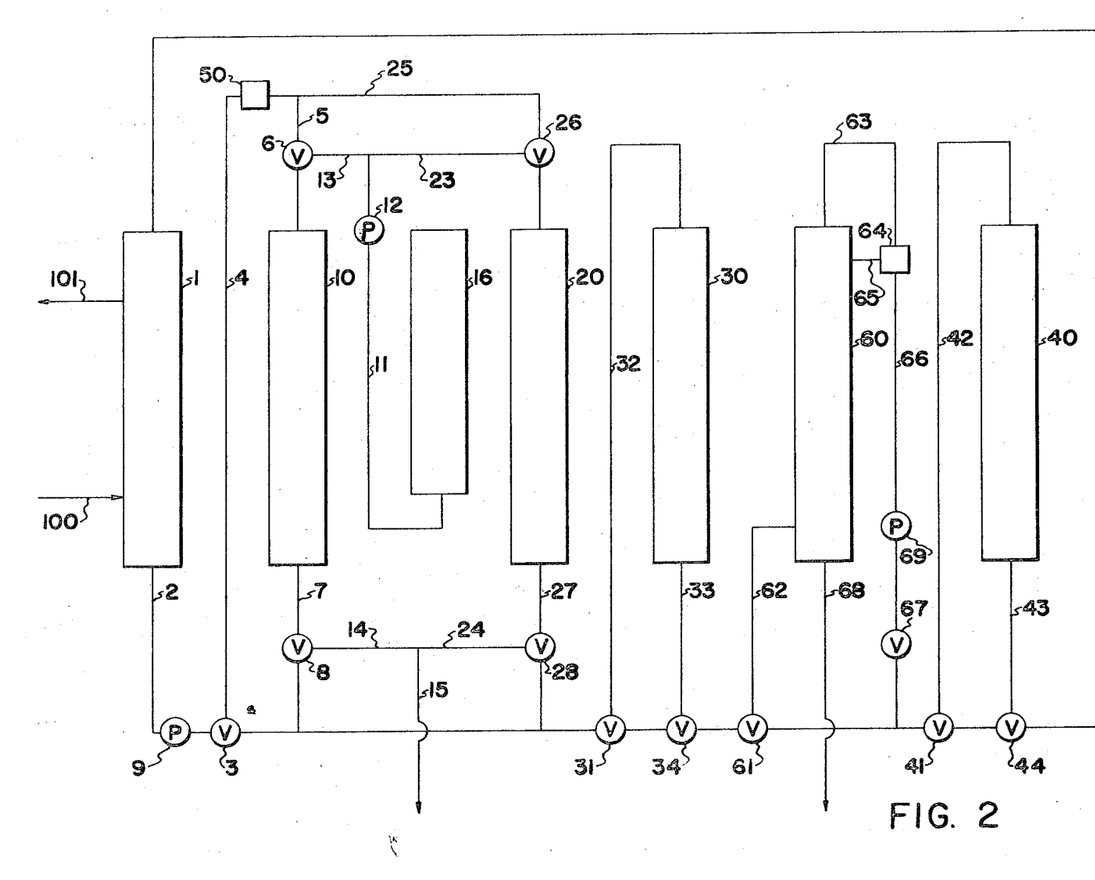
FIG. 2 is a schematic flow diagram of a further modification of the system shown in FIG. 1 wherein means to treat at least some solvent liquid by evaporation are included as a portion of the intermediate processing to prevent undesirable buildup in the solvent liquid of materials not readily adapted for removal by the ion-exchange media.

As depicted in the drawings, numeral 1 designates a column providing a zone wherein the ionic material containing component mixture being treated e.g. an alkaline cellulose xanthate) and solvent liquid are contacted. The component mixture may be batch loaded into column 1 or fed through it as an intermittently or continuously moving stream. The state of matter of the component mixture is not critical, i.e. it may comprise substances in gaseous, liquid, semi-solid, or solid form. Alkaline cellulose xanthates, for example, suitably may be provided in the form of liquids or solvent solutions (e.g. viscose) or solids (e.g. alkaline cellulose xanthate crumb). In the case of normally non-particulate solids and particulate solids having relatively large particle sizes including cellulose xanthate crumbs, preferred results are obtained by subjecting the solid to a preliminary grinding, milling homogenizing, or other convenient comminution treatment to effect particle size reduction.

Similarly, solvent liquid may be batch charged to column 1 or circulated through column 1 by pump 9 in line 2. As shown, solvent liquid flow is at least semi-continuous and for convenience is downward through the column; Upward or horizontal solvent flows in contacting zone 1 also are contemplated. In moving stream systems, the direction of solvent flow suitably may be concurrent or countercurrent to the component mixture flow. Stirrers, baffles, and other distribution means may be provided in column 1 to improve mixing and contacting efficiency.

An important factor in attaining optimum efficiencies in the present method stems from a maintenance of ionic material concentration gradients which are relatively high between the solvent liquid and component mixture. Accordingly, in preferred embodiments, either a stream of solvent liquid or component mixture is flowed through a fixed mass of the other or streams of the materials are passed countercurrently. In preferred treatments of alkaline cellulose xanthate crumb in the equipment shown in the drawings, for example, solvent liquid is passed downwardly through either a fixed bed of crumb established within column 1 or a moving bed of material formed by introducing crumb to the bottom of column 1 through line 100, conveying it upwardly by conventional mechanical conveying means, and discharging undissolved crumb residue from the top of the column through line 101.

In general, any liquid is contemplated for use as the solvent in the method of the present invention which is capable of removing from the component mixture being treated the ionic material desired to be separated, e.g. capable of forming at the contacting conditions employed solutions (including dispersions) containing at least about 0.0001% by weight ionic material, dry solids basis. The specific solvent liquid utilized in particular embodiments may vary depending, inter alia, upon the nature of the solvent, the nature and concentration of ionic material desired to be separated, the properties of the remaining components of the component mixture being treated, and the form in which the separated components are desired to be recovered, if at all. The solvent liquid need not be, but in preferred embodiments is, inert and essentially immiscible with components in the mixture being treated other than the ionic material of which separation is desired. Cases were solvent reactivity can be tolerated include instances where the ionic material separation rate effected by the solvent is fast compared to the rate at which it undesirably reacts. When some miscibility exists between the solvent and other components of the treated mixture, separation of the resultant mixture can be achieved, as described hereinafter.

In most instances, the solvent employed comprises at least one organic liquid. Inorganic liquids, e.g. anhydrous liquid ammonia, when available and where convenient, however, also can be employed. The presence of water in the solvent liquid, in many cases, improves ionic material separation efficiency. Miscible mixtures of water with one or more organic liquids, consequently, typically provide the more preferred solvent liquids. In certain instances, moreover, water alone can be utilized as the solvent. Although water normally is plentiful and re-use of it in a system through an intermediate ion exchange treatment is not warranted, situations even now exist, such as in mountainous and arid regions, where supplies are scarce and treatment and recirculation of process water proves desirable. Present trends further suggest that in the near future pollution problems and expanded consumption rates may make treatment and recycle of process water feasible, if not necessary.

In the case of alkaline polymeric alcohol xanthates, such as cellulose xanthates, for example, a wide variety of solvent liquids are useful in varying degrees for removing ionic material by the present process. Specific examples of useful solvents include water; anhydrous substances such as liquid ammonia, methanol, ethanol, n-propanol isopropanol, n-butanol, acetone, methyl ethyl ketone, ethyl ether, ethylene glycol, propylene glycol, liquid polyethylene glycols and methyl and ethyl ethers of such liquid glycols, ethyl acetate, propyl acetate, acetonitrile, 2-nitro-propane, dimethyl formamide, dimethyl sulfoxide, diethylamine, aniline, N,N-dimethylaniline, tetrahydrofuran, benzene, and cyclohexane; miscible mixtures of such anhydrous substances; and such anhydrous substances and mixtures containing water.

The natures of the above listed solvents exemplify several advantageous features of the present method. Namely, it will be apparent that the increased efficiency of the present method due to the relatively high ionic material concentration gradients which can be maintained and the rate at which ionic material separation consequently can be achieved allows the use in the present method of solvents in the following categories:

(1) Solvents having normal equilibrium solubilities (at 25° C.) of less than about 1% for the ionic material desired to be separated from the component mixture, e.g. isopropanol, dimethyl sulfoxide, dimethyl formamide, acetonitrile, and benzene;

(2) Solvents having normal boiling points at temperatures above about 100° C., e.g. dimethyl formamide and dimethyl sulfoxide;

(3) Solvents having normal boiling points (at 760 mm. Hg) below about 50° C. and even below 0° C., e.g. anhydrous liquid ammonia; and (4) Solvents having unstable, e.g. aniline; and (5) Solvents reacting with the component ultimately desired to be recovered from the component mixture, e.g. methanol and ethanol.

In certain embodiments of the method of the invention, e.g. when a solvent is employed in which ionic material is poorly soluble, separation efficiency may be improved by supplementally adding to and dissolving in the solvent liquid one or more ionic compounds which are correspondingly more weakly acidic or basic than the particular acidic or basic ion exchange medium utilized. Separation of cations from components mixtures can be aided, for example, by a supplementary addition to the solvent utilized of at least one soluble material which, on contact with ion-exchange media in the hydrogen ion form, yields an acid. Such materials include inorganic and organic acids themselves, such as hydrogen sulfide, thiocarbonic acids, acetic acid, and propionic acid. and salts of weak acids such as sodium, potassium, and ammonium bicarbonate, sulfide, thiocarbonate, acetate, and propionate. Cation-exchanged solvent liquid circulated in such embodiments of the process, thus, contain free weak acids which can react with, neutralize, and solubilize cationic material in the component mixture. When anion exchange media are employed, e.g. strongly basic anion exchange materials, removal from the component mixture of anions conversely can be aided by a corresponding supplemental addition to the solvent of at least one inorganic or organic material which, after contact with the ion exchange medium, is in the form of a base. Such materials include bases themselves, such as calcium hydroxide, magnesium hydroxide, ethanolamine, trimethylamine, and dodecyl dimethylamine and salts such as the chloride, nitrate, and sulfate salts thereof. Consequently, anion-exchanged solvent liquid recycled in such embodiments contains free bases which can react with and help solubilize into the solvent liquid anionic material from the component mixture. Advantageously such supplemental additives may be chosen which can diffuse across interfaces (e.g. liquid) between the solvent liquid and component mixture being treated and thereby increase the contacting efficiency of the solvent. A further feature of ultilizing such supplemental additives is that buffering of the pH of the solvent liquid can be achieved thereby. In instances involving treatments of component mixtures to separate ionic contaminants from primary substances which themselves are sensitive to strong acids and/or alkalis, for example, conventional or other buffering agents such as acetate, orthophosphate, citrate, and the like (e.g. mixtures of free acid and corresponding alkali salt, e.g. sodium salt) buffers, if desired, can be employed in the supplemental material addition.

Commercially-prepared crude alkaline polymeric alcohol xanthate products, e.g. viscoses and cellulose xanthate crumbs typically have pH's exceeding about 13 (diluted to 1% by weight in water) and a D.S. (degree of substitution is the ratio, expressed here as a percentage, of the average number of hydroxyl groups substituted to the total number of available hydroxyl group sites) of at least about 3% and ranging up to 100%. In preferred embodiments of the method, involving separation of ionic material from such substances, solvents found to be more efficiently effective include water and organic liquid containing mixtures such as water-isopropanol mixtures, water-acetone-acetic acid mixtures and water-methanol-acetic acid mixtures.

The contacting of the component mixture and solvent in column 1 is carried out under conditions such that at least a portion of the ionic material in the component mixture is dissolved and carried into the solvent liquid phase. Solvent-to-component mixture mixing ratios, flow rates, contact times, temperatures, pressures, and other conditions can be varied in the conventional manner to achieve optimum efficiencies. Temperatures, pressures, and vapor environment, if any, of course, preferably are maintained at levels at which the various substances present are stable and which desirably affect equilibriums obtaining, e.g. maintain the solvent in the liquid phase and favor ionic material removal. One feature of the present method lies in the ability of the present method to effect efficient separation of ionic material at temperatures significantly lower than those feasible in conventional solvent separations. This characteristic allows heat-sensitive and other component mixtures, such as alkaline cellulose xanthates, to be treated by contact with solvents at relatively low temperatures, e.g. temperatures below about 40° C. and ranging down to temperatures at the particular solvent liquid employed either solidifies or loses its ability to efficiently contact the ion-exchange media, e.g. its ability to cause an ion-exchange resin to swell. The ability to use low temperatures, as stated, also is advantageous in allowing the possible use of thermally unstable solvents, such as amines. Another feature of the present method, and in continuous embodiments thereof in particular, lies in the reduced amounts of solvent liquid needed to achieve separations of ionic material as compared to conventional techniques. This results from the concentrating gradient of ionic material between the component mixture and recirculating solvent liquid being kept at a relatively high level by the action of the ion-exchange medium. Solvent volumes required in the present method, accordingly, suitably may be below that (100%) theoretically required for the particular solvent employed to dissolve simultaneously at the contacting conditions obtaining all ionic material present in a component mixture and range down to and below 5% of the normal theoretical minimum, e.g. volumes below even 0.1% of theory are contemplated.

In particular embodiments, the component mixture being treated is contacted with solvent liquid until the desired amount of ionic material removal is achieved. Depending upon the nature of the component mixture and type of contacting employed (e.g. batch or continuous stream treatment with or without recycle of component mixture), the undissolved residue of the treated component mixture then may be discharged from column 1 or a component mixture recirculation loop (not shown) including column 1. Depending upon whether material ultimately desired resides in the undissolved residue, the recovered residue may be utilized, further treated or discarded. In treatments of alkaline polymeric alcohol xanthates by the present method, for example, the undissolved xanthate residues are the desired products. Regarding cellulose xanthates, more particularly, the desired products are residues constituting cellulose xanthate crumbs having a pH below about 12, preferably in the range of from about 9 to about 11. Such crumbs have improved storage stability as compared to commercially prepared xanthate crumb and can be dispersed in water or another common xanthate solvent and used in any manner typical of conventional viscose.

In accordance with the present method, solvent liquid containing dissolved ionic material resulting from the described contacting with component mixture then is treated and readied for re-use in the process. In the present method, this is accomplished by contacting the ionic material containing solvent with at least one immiscible ion exchange medium effective to separate from the solvent at least a portion of the dissolved ionic material. Referring to the drawings, ionic material containing solvent exits from column 1 through line 2 and is circulated by pump 9 through valve 3, line 4 (optionally, entrained solids removal means 50), line 5, and valve 6 to a zone, designated column 10, wherein the described solvent-ion exchange medium contacting occurs.

The nature of the ion exchange medium or combination of media (including same or different type) employed in particular embodiments depends primarily on the ionic material desired to be separated. For the removal of cations, the method embraces the use of any convenient solid or liquid cation exchange materials. Solid cation exchange materials include conventional cation exchange resins available in either the hydrogen ion or salt form (e.g. sodium or ammonium salts) including resins containing sulfonate, phosphonate, and/or carboxylic groups such as sulfonated phenol-formaldehyde resins, including those prepared by condensation of phenol sulfonic acid with formaldehyde, or by alkaline condensation of sodium phenolate with sodium sulfite and formaldehyde, e.g. Zeo-Karb 215, Zeo-Karb 315, Amberlite IR 1, Amberlite IR 100, Duolite C 10, Duolite C 3, and Dowex 30; sulfonated polystyrene resins including polystyrene sulfonates cross-linked with divinyl benzene, e.g. Zeo-Karb 225, Amberlite IR 120, Duolite C 20, Dowex 50, and Nalcite HCR; sulfonated coal, e.g. Zeo-Karb H 1; nuclear-substituted polystyrene phosphonate resins, e.g. Duolite C 60 and Duolite C 61; and carboxylic resins, such as carboxylated phenol-formaldehyde resins, e.g. Zeo-Karb 216, and co-polymers of acrylic acid with divinyl benzene, e.g. Zeo-Karb 226, Amberlite IRC 50, and Duolite CS 100. Other solid cation exchange media which can be used include acid-treated zeolites and naturally occurring non-resinous solid cation exchange materials, e.g. cellulose, wood fibers (bast fiber) including fabricated forms thereof such as webs, papers, fabrics, and the like. Liquid cation exchangers include dispersions of long-chain fatty acids and higher alkyl alcohol ester acids, e.g. lauric acid, caproic acid, stearic acid, and oleic acid, lauryl sulfate, caproic sulfonate, stearyl phosphate, and tallow phosphonate in organic liquids, e.g. carbon tetrachloride, benzene, mineral oil and the like.

For removing anions from component mixtures, the present method contemplates the use of any conventional solid and liquid anion exchange materials. Solid anion exchangers include conventional anion exchange resins which are available in hydroxyl ion form and salt form (e.g. chloride, nitrate, and bicarbonate salts) including intermediate strength base anion exchanger resins, such as cross-linked polystyrene quaternarized with dimethylethanolamine, e.g. Dowex 2, Amberlite IRA 410, and Nalcite SAR; strong base anion exchange resins, such as cross-linked polystyrene quaternarized with trimethylamine, e.g. De-Acidite FF, Amberlite IRA 400, and Dowex 1; and porous anion exchange resins, e.g. Decolorite and Duolite S 30. Other suitable anion exchangers include naturally occurring anion exchangers, e.g. proteins containing ionizable amino groups, polymeric betains, etc., as well as liquid anion exchange materials such as dispersions of quaternary ammonium hydroxides and salts, e.g. the hydroxyl, nitrate, chloride, and methyl sulfate forms of monolauryl, monocapryl, monostearyl, and monotallyl trimethyl ammonium compounds in carbon tetrachloride, benzene, mineral oil and the like.

Also contemplated for use as an ion exchange medium in the present method are ion retardation resins, i.e. ion exchange resins prepared by polymerizing a monomer which forms a polymer having ion-exchange capacity inside the pores of an ion exchange resin of opposite charge such as a monomer producing a polymer having cation-exchange capacity inside an anion exchange resin or a monomer forming a polymer having a capacity to exchange anions inside a cation exchange resin, e.g. Retardion 11A8 (a resinous material prepared by polymerizing acrylic acid inside a quaternary strong base styrene resin).

In embodiments of the present method wherein alkaline cellulose xanthates (and other polymeric alcohol xanthates) are treated for ionic material separation, separation of alkali impurities (and some combined alkali) more advantageously can be achieved by the use, as the ion exchange medium, of the above-described strongly acid cation exchange resins (hydrogen ion form). It further surprisingly was found that such resins additionally adsorb within their matrix some of the anion content of solvent liquid effluents obtained by contacting such crude xanthates. Such strong acid cation exchange resins, hence, constitute the preferred ion exchange media for use in treating the described xanthates.

Where removal alone of hydroxyl ions and the anions of other impurities typically present in such polymeric alcohol xanthates, e.g. anions of contaminating by-products such as mono-, di-, and trithiocarbonates, thiosulfates, and sulfides, is desired, anion exchange resins often more suitably can be utilized. Treatment of alkali-containing xanthates more advantageously can be carried out using anion exchange resins in the form of salts (non-hydroxyl ion form) of strong acids, e.g. chloride, nitrate, etc. salt forms, to provide a neutralized product. In other instances such as where cation exchange also is carried out in conjunction with anion exchange, the use of anion exchange resins in the hydroxyl form may be preferred. Other preferred embodiments utilize ion retardation resins, since they may be regenerated by merely washing with water.

Referring to the drawings, contacting of the solvent and ion exchange medium in column 10 suitably can be carried out in any conventional manner including providing the ion exchange medium in the form of a fixed or moving bed or stream and bringing solvent liquid into contact therewith by batch-mixing or by continuous concurrent or countercurrent flow. Efficient diffusion rates, for example, can be obtained in embodiments wherein the ion exchange medium is an ion exchange resin by establishing a fixed bed of resin within column 10 and passing solvent through the bed until the desired ion material removal is obtained or the bed is exhausted or its exchange efficiency becomes undesirably low. When the latter occurs, if further treatment of the component material is desired, the operation need not be interrupted as the solvent liquid feed for ion exchanging can be diverted to a second column 20 wherein the solvent is contacted by the same or a different type of ion exchange medium as in column 10. In the arrangement shown, this can be accomplished by closing valve 6 and opening valve 26 whereby solvent liquid feed passes from line 4 into line 25 and then into column 20 through valve 26.

While column 10 is off-stream, the ion exchange medium present therein may be regenerated by contact with a suitable immiscible regeneration liquid. Regeneration liquid can be passed from a supply tank 16 to column 10 by means of pump 12 and lines 11 and 13, re-positioned valve 6 (three-way), and line 4. The type of regeneration fluid employed, of course, depends upon the nature and desired regenerated form of the ion exchange medium. Cation exchange materials, for example, can be regenerated to the hydrogen ion form by contact with a suitable amount of a strong acid such as hydrochloric acid, nitric acid and the like or to a desired salt form (e.g. sodium salt form) by contact with an appropriate salt (e.g. sodium chloride). Anion exchange materials may be regenerated to the hydroxyl form by contact with solutions of strong bases such as sodium hydroxide, ammonium hydroxide and the like, or a desired salt form (e.g. nitrate salt) by treatment with a corresponding salt solution (e.g. sodium nitrate). Ion retardation resins, on the other hand, can be regenerated by contact merely with water or similar hydrophilic liquids. Ion exchange medium in column 20 similarly can be regenerated. If effective, regeneration liquid can be passed to column 20 through lines 11 and 28, repositioned valve 26 (three-way), and line 25. In instances wherein columns 10 and 20 contain differing types of ion exchange materials (e.g. column 10 contains a cation exchange resin and column 20 contains an anion exchange resin), a separate supply of regeneration liquid for column 20, similar otherwise in connection to tank 16, can be provided. Liquid containing ionic material eluted from ion exchange media in column 10 is then removed from the system through line 7, valve 8, and lines 14 and 15. Effluent from the regeneration of column 20 similarly is withdrawn through line 27, valve 28, the lines 24 and 15.

Solvent liquid ion-exchanged in columns 10 and 20 may be recirculated directly to column 1 by pump 9 in line 2 for re-use in contacting and removing additional ionic material from the same or a different batch or stream (recirculating) of component mixture.

Following ion exchange treatment in column 10 or 20, the solvent liquid still may contain extraneous contaminants such as materials solubilized from the component mixture and passed through the ion exchange medium, substances extracted from the ion exchange medium or substances produced in the ion exchange mechanism. In treatments of cellulose xanthate crumb by the present method, for example, the solvent liquid after ion exchange treatment by cation exchange materials, as described above, typically contains anions of by-product sulfur compounds of the xanthalation reactant, and water. When such materials are present, to prevent an undesirable buildup of them in the circulating solvent, they more desirably periodically or continuously are removed. Such separation in the present method suitably may employ any conventional treatment for purifying liquids including absorption, solvent extraction, dialysis, ultrafiltration, electrophoresis, and the like. In certain treatments, e.g. embodiments treating cellulose xanthate crumbs, one preferred technique for maintaining the purity of the circulating solvent at desired levels entails the combined use of effective sorbents. In the drawings, numeral 30 represents a treating zone (e.g. column) containing a bed of a solid sorbent material, such as a conventional solid sorbent, e.g. activated carbon, an adsorbent ion exchange resin (e.g. strong acid cation exchange resin of the above-described type collaterally being used as a sorbent to supplement or complete removal of undesirable anions, etc.), or the like. Numeral 40 designates a treating zone (e.g. another column) containing an effective moisture sorbent such as a bed of zeolite molecular sieves. Ion-exchanged solvent effluent periodically or continuously can be passed through either one or both of zones 30 and 40 by properly positioning valve 31 in column 30, feed line 32, valve 34 in line 33 discharging column 30, valve 41 in feed line 42 to column 40, and valve 44 in discharge line 43 of column 40. So treated solvent liquid is recirculated through line 2 by pump 9 to separation zone 10, as described above, to contact additional component mixture. When and if desirable, sorbent materials in zones 30 and 40 can be replaced by fresh material or regenerated by well-known procedures.

As described above, the preferred embodiments of the invention involving treatment of alkaline cellulose xanthates utilize solvent liquids which are essentially immiscible with a portion of the component mixture desired to be recovered, e.g. the xanthates. In such instances, the solvent liquid effluent from ion exchange treatment in column 10 and/or 20 typically contains only trace amounts of the desired component. As broadly conceived, the method of the present invention also embraces the use of solvent liquids displaying varying degrees of miscibility, i.e. ranging in fact from partial to total miscibility, with portions of the component mixture other than the separated ionic material portion. When utilized, such solvent liquids provide ion-exchanged solvent effluent streams which may contain significant quantities of extraneous non-solvent material. In such and other cases, separation and recovery of the solvent liquid from the extraneous material by distillation may be feasible. The collateral use of distillation for solvent recovery in the present method need not, however, present the problems which obtain in conventional solvent recovery processes. Advantageously the present method, as stated, allows one not only a wider choice of solvent liquids including those having relatively low boiling points, e.g. normal boiling points below about 40° C., but enables a reduction in both the frequency of distillation (conventional ionic material removal cycles by distillation are replaced by cycles in which such removal is achieved by ion exchange) and the solvent evaporation load. FIG. 2 illustrates such embodiments. As shown there, ion-exchanged solvent effluent from column 10 or 20, if desired, may be fed into a distillation column 60 through line 62 and valve 61 located in recirculation line 2.

In column 60, vaporous solvent may be collected overhead, condensed in cooler 64 adapted for refluxing the column through line 65 and then passed by pump 69 through line 66 to main solvent recirculation line 2. Unvaporized material is removed through a bottoms discharge line 68. In some instances, the bottom stream represents a recovery of the ultimately discharged material.

As depicted, solvent liquid is shown as the overhead stream of column 60. As will be apparent, of course, depending upon the relative boiling points of the solvent liquid and the extraneous materials desired to be separated therefrom, solvent liquid also could in some cases be recovered from column 60 as a bottom stream.

The above description in the main is directed to embodiments of the present method wherein alkaline polymeric alcohol xanthates, and in particular alkaline cellulose xanthates, constitute the component mixtures being treated for separation of ionic material. In its broadest aspects, the present method, as exemplified by the techniques, solvents, ion exchange materials, and the like above described, contemplates the treatment of any component mixture for separating ionic material-containing component mixtures comprising substances in the gaseous, vaporous, liquid, semi-solid (e.g. gums, gels, pastes and the like) and/or solid state. As will be apparent, the contacting of component mixture and solvent in the present method embraces treatments conventionally known as scrubbing (gas treatments), extraction (liquid and semi-solid treatments) and leaching (semi-solid and solid treatments).

While treatments of component mixtures broadly are contemplated, the present method, as stated above with respect to the treatment of polymeric alcohol xanthates, is especially suited for use in effecting certain types of ionic material separations. Examples of such cases, some of which overlap, are the following:

(1) Separations of ionic materials from heat-sensitive substances, e.g. purification and recovery of heat-sensitive vitamins and proteinaceous materials such as vitamin $B_{12}$ (from fermentation liquors), collagen, blood albumin, and enzymes (from fermentation cultures or tissue extracts) including alpha-amylase, glucoamylase, pancreatin, and pepsin;

(2) Separations of ionic materials from acid-sensitive materials, e.g. purification and recovery of proteinaceous materials such as collagen, blood albumin, and enzymes such as alpha-amylase and glucoamylase, as well as inorganic and organic bases such as ammonia (from coking process vapors) and monolauryl trimethyl ammonium hydroxide;

(3) Separations of ionic materials from alkaline-sensitive substances, e.g. purification and recovery of the inorganic and organic acids such as phosphoric acid (from wet process liquors), citric acid (from naphthalene-containing fermentation cultures), glutamic acid (from fermentation cultures);

(4) Separating of ionic materials from substances having closely similar solubilities to the ionic materials such as separations of monomers from polymers, e.g. caprolactam from polycaprolactam and separations of soluble by-products from substances purposely tailor prepared to be soluble, e.g. by-product sodium chloride separations from carboxymethyl cellulose hydroxyethyl ethers; and (5) Separations of ionic materials from compositions in which they are present in small concentrations such as separations of hydrochloric acid from analytical grade sodium chloride, of carbon disulfide and hydrogen sulfide from the xanthation plant stack gases, and of uranium compounds from phosphate rock extracts.

The method of the present invention having been described in detail, the following examples are presented to show specific examples thereof. It will be understood the examples are given merely for illustration purposes and not by way of limitation.

EXAMPLE I

This example illustrates the purification of impure alkaline cellulose xanthate crumb using the combined effects of an acetone-water-acetic acid solvent mixture and a strong acid cation exchange resin.

About 50 grams of a crude sodium cellulose xanthate crumb having pH of about 13.5 and a xanthate sulfur content of about 22%, cellulose, dry solids weight basis, is reduced to a particle size approximating —20 mesh by being beaten in a blender in the presence of about 200 ml. of a solvent liquid consisting of an 80:20 (volume ratio) acetone-distilled water mixture containing about 2 gm. sodium acetate. The resultant comminuted xanthate crumb-solvent mixture then is placed in a 12 in. high glass column of 2.125 in. inside diameter provided with an interior bottom support consisting of a 0.75 in. bed of No. 4 glass beads sandwiched between two layers of 50 mesh stainless steel screen. A closed loop is formed by connecting the crumb-containing column (through bottom-to-top glass tubing connections) to a 12.5 in. high glass column having an inside diameter of about 0.81 in. and containing a supported 10 in. high bed (85 ml.) of Dowex 50WX-8 (hydrogen ion form), a strong acid cation exchange resin, supported on a 50 mesh screen. Cooling means are provided for maintaining the temperature of liquid in the system at about 6° C. After an additional 150 ml. of acetone-water-sodium acetate mixture of the described composition is added to the system, liquid at about 6° C. is pumped and circulated around the resultant loop at a rate of about 300 ml./min. After 10 minutes (about 20 cycles by the solvent), circulation is discontinued and the resultant treated xanthate crumb is inspected. The treated crumb produced is a material of significantly improved purity. The purity improvement is evidenced by the ready solubility of the treated material in water (1% concentration), its lower content of color body contaminants—it has a slight yellow green color as opposed to the bright orange of the crude starting material, and its lower alkali content—the observed pH of about 11.2 (1% in water), when compared to the pH of 13.5 of the starting crude material, indicates over 99% of the free alkali has been removed. Xanthate analysis carried out on a sample of the treated crumb which is filtered in a vacuum flask, washed in acetone, and then dissolved in water indicates the treated crumb has a xanthate sulfur content of about 19.6%, dry cellulose solids weight basis.

To determine the stability of the treated crumb, a sample is washed in acetone, filtered, dried under vacuum at 25° C. for about 2 hours, and then held at room temperature in a phosphorous pentaoxide desiccator. Analysis at varying intervals indicates the sample is relatively stable. The appearance of insolubles, for example, remains under about 3% by weight, dry cellulose basis, for up to six days. The sample further maintains a xanthate sulfur content of over about 11% by weight, dry cellulose basis, for at least 15 days.

Solutions of the treated sodium cellulose xanthate crumb in water are viscous liquids which can be extruded or deposited and then regenerated to correspondingly form shaped cellulose products, e.g. films and fibers, cellulose coatings, products impregnated with cellulose, and the like.

EXAMPLE II

This example illustrates another embodiment of the method of the invention wherein crude alkaline cellulose xanthate crumb is purified using a combination of an n-propanol-water solvent mixture and a strong acid cation exchange resin.

Following the general procedure of Example I, about 100 grams of another crude alkaline cellulose crumb having a pH of about 13.5 and containing about 22% by weight xanthate sulfur, cellulose dry solids basis, is comminuted in the presence of 200 ml. of solvent to approximating —20 mesh in a blender and then loaded in the 12 in. glass contacting column employed, excepting a 77:23 (by volume) mixture of n-propanol and distilled water is employed as the solvent in place of the acetone-water-sodium acetate solvent mixture. As in Example I, the resultant crumb-containing column is connected (bottom-to-top) to a second column with glass tubing. In this instance, the second column is a 12 in. high glass column of about 1.19 in. containing a 10.5 in. high bed of the Dowex 50WX-8 resin supported on about 0.5 in. of glass wool. Following addition of an additional 255 ml. of the n-propanol-water mixture to the system, circulation of solvent liquid through the loop is established at about 23° C. and a flow rate of about 300 ml./min. by an in-line pump. Circulation of liquid is continued to provide a treated crumb essentially free of free caustic (e.g. after 61 minutes the treated crumb had a pH of about 9.4). Solvent liquid treatment is continued for an additional 50 minutes and then terminated. The resultant treated crumb material is a fluffy, near white (very light greenish) solid. Solvent liquid flow is then re-started, excepting the Dowex resin-containing column is cut out of the system and flow instead is through a third column connected in parallel thereto, the third column being a 17.5 in. high glass column of 1.125 in. inside diameter containing a 15 in. bed of moisture absorbent material, zeolite molecular sieves having an effective pore size of about 4 angstroms. Circulation of solvent between the crumb and molecular sieve-containing column is continued for about 120 minutes and then stopped.

The resultant product produced is a substantially stable, readily water-soluble, solid sodium cellulose xanthate having a moisture content of less than about 5%, total weight basis, and properties similar to those produced in Example I.

EXAMPLE III

This illustrates the purification of crude caustic cellulose xanthates by the method of the present invention using combinations of a strongly acid cation exchange resin, additional solvent liquids, and supplemental treatments of the solvent liquids.

Following the general procedure of Example I, each of the solvents listed in Table 1 below are used to contact separate samples of crude caustic cellulose xanthate crumbs having pH's of approximately 13.5 and xanthate sulfur contents of approximately 22% by weight, dry cellulose solids basis. In each case, prior to being loaded in the treating column the crumb samples are comminuted by being beaten in a blender (3 minutes) in the presence of about 200 ml. of the particular solvent employed. After crumb sample loading into 12 in. high glass columns of 2.125 in. inside diameter bottom supported as in Example I, the remainder of the total solvent charge employed is added to the system (in each case containing the Dowex 50WX-8 column) and then solvent circulation is started. In four runs, the solvent liquid employed in addition to the ion-exchange treatment, is contacted with sorbent material to remove non-aqueous and/or non-ionic extraneous materials picked up from the crude crumb. In the remainder of the runs, the solvent liquid is supplementally contacted with a sorbent material which removes moisture and thus dries the system including the xanthate crumb. The details of the respective runs and the respective results obtained are set forth in Table 1.

TABLE 1

| Solvent | | Total amount, ml. | Auxilliary treatment | Size of ion exchange column, Dowex 50WX-8 | | | Contact conditions | | | Crumb | | | | | |
|---|---|---|---|---|---|---|---|---|---|---|---|---|---|---|---|
| Composition | | | | Diameter, inch | Height, inch | Volume, ml. | Temperature, °C. | Solvent flow rate, ml./in. | Starting properties | | | Treated properties | | | |
| | | | | | | | | | Amount used, grams | pH | Color | Contact time, minutes | pH | Color | |
| Acetone-water, 75:25 v./v | | 400 | C1 | 0.875 | 15.625 | 114 | 2 | 62.5 | 50 | 13.5 | Orange | 48 | 11.0 | Greenish, top of bed. | |
| Do | | 350 | C1 | 0.875 | 15.625 | 114 | 7 | 62.5 | 50 | 13.5 | ...do... | 100 | ..... | Do. | |
| Isopropanol-water mixture, 77:23 v./v | | 350 | C2 | 0.81 | 12.5 | 85 | 25 | 62.5 | 50 | 13.5 | ...do... | 88 | 12.4 | Light orange. | |
| 2-nitropropane-acetic acid, 300:1 v./v | | 400 | C2 | 0.81 | 12.5 | 85 | 25 | 62.5 | 50 | 13.5 | ...do... | 75 | 9.1 | Very light yellow. | |
| Isopropanol-water, 90/10 v./v, with C₂H₅COONa, 0.5 gm./100 mL | | 400 | D | 0.81 | 12.5 | 85 | 25 | 300 | 100 | 13.5 | ...do... | 35 | 10.6 | Light yellow. | |
| Acetone-dimethylsulfoxide, 80:20 v./v, with C₂H₅COONa, 1 gm./100 mL | | 400 | D | 0.81 | 12.5 | 85 | 25 | 300 | 100 | 13.5 | ...do... | 33 | 9.8 | Slight yellow. | |
| Acetone-methylethylene glycol ether, 50:50 v./v | | 400 | D | 0.81 | 12.5 | 85 | 25 | 300 | 100 | 13.5 | ...do... | 65 | 11.0 | Light orange. | |

NOTE:
C1: Ion exchanged solvent circulated through 15.625 in. high glass column of 0.825 in. inside diameter and containing 10.25 in. bed (47.9 gm.) of activated cocoanut charcoal; C2: Same as in C1 but only 23.9 gm. cocoanut charcoal in column D: As in Example II, crumb subsequently dried using molecular sieves.

The results in Table 1, taken with those shown in Examples I and II clearly demonstrate the wide range of solvents useful in the method of the invention. The results further show the present method makes possible the use of conditions heretofore considered prohibitive, e.g. relatively low contacting temperatures, e.g. those in the range of from about 0° C. to about 30° C., and normally poor solvents. Additionally manifested by the results obtained (the treated crumb produced using the 77:23 isopropanol-water mixture as the solvent, for example, has a xanthate sulfur content—about 20.4%—evidencing substantially little loss of derivative occurring in the treatment) is the fact that the present method adequately provides a safe effective alternative to decausticizing and spray drying viscose for providing relatively stable, solid cellulose xanthates.

EXAMPLE IV

This example illustrates the purification of crude alkaline cellulose xanthate crumb using the combined effects of a solvent and a weak acid cation exchange resin.

Another sample of crude alkaline cellulose xanthate crumb having a pH of approximately 13.5 and a xanthate sulfur content of about 22%, cellulose solids basis, is treated according to the general procedure of Example I, excepting in the treatment the amount of crumb treated is increased to about 100 gm., the total amount of described acetone-water-sodium acetate solvent liquid used is 500 ml. instead of 350 ml., the solvent temperature used is 25° C. instead of 6° C., and Amberlite IRC 50, a weak acid cation exchange resin, is substituted for the Dowex resin. In the treatment, solvent circulation is continued through the loop containing the crumb and cation exchange column for about 60 minutes, then is stopped, and on restart, is instead through a loop containing the crumb column and a column containing moisture absorbent molecular sieves connected in parallel to the ion exchange resin column as in Example II.

The resultant purified product is a relatively stable cellulose xanthate in the form of a fluffy, near white (slightly yellow) solid having a pH of about 10.0 and a moisture content of less than about 5%, total weight basis, and being in general similar in overall properties to the treated xanthates of the preceding examples.

EXAMPLE V

This example illustrates another embodiment of the method of the invention involving the purification of crude alkaline cellulose xanthate crumb using a combination of an acetone-water-acetic acid solvent and an inorganic cation exchange solid.

Following the general procedure of Example I, another sample of crude alkaline cellulose xanthate crumb having a pH approximating 13.5 and a xanthate sulfur content approximating 22%, cellulose dry solids weight basis, is purified excepting, a total of 500 ml. of the acetone-water-sodium acetate solvent mixture is used instead of 350 ml., the circulating solvent temperature is about 25° C. instead of 6° C., and a greensand glauconite, a $K_2(Mg, Fe)_2Al_6(Si_4O_{10})_{12}$ from which iron has been exhausted, is substituted as the ion exchange media for the Dowex resin. Solvent circulation through the crumb-glauconite loop is carried out for about 97 minutes and then as in Examples II and IV, shifted to a parallel loop containing the crumb column and a column containing moisture absorbent-zeolite molecular sieves.

The resultant product obtained is a purified cellulose xanthate crumb which is a relatively stable, fluffy, greenish solid having a pH of about 11.5 and containing less than about 5% moisture, total weight basis.

EXAMPLE VI

This example illustrates another embodiment of the method of the invention entailing a treatment of crude cellulose xanthate crumb using a combination of a solvent and an ion retardation resin.

Another sample of crude alkaline cellulose xanthate crumb having a pH of about 13.5 and a xanthate sulfur content approximating 22%, cellulose dry solids weight basis, is purified by repeating the general procedure of Example I, excepting the amount of crumb employed is 100 gms., the solvent utilized is 500 ml. of a 80:20 (volume ratio) mixture of acetone and dimethyl sulfoxide at about 25° C., and an ion retardation resin, Retardation 11A (prepared by polymerizing acrylic acid inside a quaternary strong base styrene resin) is substituted for the Dowex resin in the ion exchange medium bed. In the treatment, solvent circulation through the system is carried out over a period of about 91 minutes. At the end of this period, the product obtained is slightly purified, i.e. it has a pH of about 13.3. Impurity removal has been accomplished, however, since orange-colored impurities originally present in the crude crumb initially are plainly visible as deposits on the ion retardation resin and then are removed by passing a regeneration water stream through the column containing the resin.

EXAMPLE VII

This example illustrates another embodiment of the method of the invention wherein crude alkaline cellulose xanthate crumb is purified by a treatment utilizing the combined effects of a solvent for ionic impurities present and a liquid ion exchanger.

About 50 gm. of a sample of crude alkaline cellulose xanthate having a pH approximating 13.5, a xanthate sulfur content approximating 22%, cellulose dry solids weight basis, and a D.P. (D.P. is degree of polymerization and represents the average number of anhydroglucose units per molecule) of about 2000 initially is screened to −20 mesh and then loaded in a treating column, as in Example I. The crumb column is connected as in Example I to a second column, excepting in this case the second column is a 24 in. high glass column of 1 in. inside diameter filled with No. 4 glass beads, the connection (glass tubing) of the top of the crumb column is with the top of the glass bead-containing column, and the bottom of the crumb column is connected with the bead column at a point 6 inches above the bead column's lower end. The extreme lower end of the glass bead-containing column is connected to the upper end thereof at a point 6 inches below the actual top through a glass tubing loop containing another pump.

Water (400 ml. added) is circulated around the loop containing the crumb column and the glass bead column at a rate of about 10 ml./min. by an in-line pump. In the glass bead column, the circulating water stream is contacted by a solution of about 150 gm. of monolauryl acid orthophosphate in 400 ml. of carbon tetrachloride being circulated around the glass bead-containing column countercurrently to the water stream at a rate of about 10 ml./min. Circulation of the two streams is continued for about three hours.

The resultant treated cellulose xanthate crumb is a purified product lighter in color as compared to the starting bright orange material.

EXAMPLE VIII

This example illustrates other embodiments of the present invention entailing the treatment of crude alkali cellulose xanthate crumbs employing combination of an acetone-water-acetic acid solvent and various anion exchange materials.

The procedure of Example I is repeated three times to separately treat three other samples of crude alkaline cellulose xanthate crumb having a pH approximately 13.5 and a xanthate sulfur content of about 22%, cellulose dry solids weight basis, excepting 50 mesh Dowex 1X–4 (chloride ion form) anion exchange resin, 50 mesh Amberlite IRA 400 (nitrate ion form) anion exchange resin, and 50 mesh Nalcite SAR (nitrate ion form) anion exchange resin, each in turn, is substituted for the Dowex cation exchange resin in the ion exchange column.

The treated crumb products thus obtained, in each case, are of improved purity as evidenced by their lighter color and lower pH as compared to the respective starting bright orange crumb samples.

EXAMPLE IX

This example illustrates another embodiment of the method of the invention wherein crude alkaline amylose xanthate is treated utilizing the combined effects of a solvent for ionic material present and an ion exchange medium.

The general procedure of Example I is repeated using the desired acetone-water-sodium-acetate solvent system and Dowex 50WX-8 cation exchange resin, excepting 50 gm. of solid crude sodium amylose xanthate, produced according to Example 3 of U.S. Pat. 3,291,789, is substituted for the cellulose xanthate crumb.

The resultant product is a solid amylose xanthate material of improved purity as evidenced by its having a lighter color than the bright orange starting crude xanthate.

EXAMPLE X

This example illustrates an embodiment of the present method wherein viscose is treated using the combined effects of a solvent for the ionic materials present and an ion exchange material.

About 100 ml. of commercial viscose solution, ripened and ready for extrusion, and containing about 8% cellulose, 6.6% total alkali (free and combined sodium), 0.9% xanthate sulfur (viscose, as is weight basis), and having a D.P. of about 1200 is stirred for about 10 minutes with about 400 ml. of an azeotropic mixture of benzene and water containing about 8 gm. of sodium acetate. The resultant mixture is then allowed to stand and separate. The resultant benzene-rich layer is circulated through Dowex 50WX-8 cation exchange resin-containing column of the size described in Example I above. The ion-exchanged solvent is then re-mixed as before with the once treated viscose product obtained in the described separation step, the resultant mixture is separated, and the benzene layer obtained is again ion-exchanged. The overall treatment of the viscose sample is repeated four additional times.

The resultant viscose product obtained has a lightened color as compared to the starting viscose, manifesting significant separation of the ionic contaminants initially present has occurred.

EXAMPLE XI

This example illustrates an embodiment of the method of the invention wherein a component mixture (i.e. a gum) which is soluble in ordinary solvents is purified using a solvent for ionic contaminants and a combination of ion exchange materials.

About 50 gm. of a crude mixture comprising (1) a mixed cellulose ether gum having a hydroxylethyl substituent D.S. of about 50% and a carboxylmethyl substituent D.S. of about 23% and (2) ionic contaminants constituting excess reactants, caustic, and by-product salts (e.g. sodium chloride) introduced into (1) via its synthesis, is purified by initially slurrying the crude ether gum in about above 500 ml. of an 80:20 (volume ratio) mixture of acetone and distilled water and then loading the resultant slurry into a column similar to the column of Example I used for xanthate crumb. The column being connected (bottom to top) through glass tubing to a second glass column similar to the column of Example VIII containing Dowex 1 (hydroxyl ion form) anion exchange resin, the latter, in turn, being connected (bottom to top) to a third glass column consisting of a Dowex 50WX-8 cation exchange resin (hydrogen ion form)-containing column similar to that of Example I. A loop containing the column arrangement is closed by tubing connecting the bottom of the Dowex resin-containing column to the top of the gum-containing column. Liquid then is circulated around the system at about 25° C. and a flow rate of about 500 ml./min. by an in-line pump. Material in the gum-containing column is agitated by a stirrer which is provided. After about 30 minutes, circulation is stopped and a sample of the cellulose ether gum is tested for contaminant content.

The resultant treated ether gum obtained is an essentially pure product as evidenced by a standard test thereon for chloride ion (using silver nitrate) yielding a negligible response. In contrast, an identical test carried out on a sample of the crude starting gum gave a strong positive response for chloride ion.

EXAMPLE XII

This example illustrates an embodiment of the present invention involving treatment of a highly heat-sensitive component mixture (i.e. a liquid) for ionic material removal.

About 100 ml. of bovine blood, freshly taken, is loaded into a continuous liquid-liquid extraction apparatus for heat-sensitive solids of the type shown in Weissburger, Technique of Organic Chemistry, vol. III, p. 230. Following the procedure of Example XI, the extraction apparatus is connected in series with a Dowex 1 (hydroxyl ion form) anion exchange resin-containing column and a Dowex 50WX-8 (hydrogen ion form) cation exchange resin-containing column to form a closed loop. At about 10° C. about 100 ml. of n-butanol saturated with water then is circulated around the system at a rate providing one cycle/min., the material in the extraction apparatus being gently mixed to avoid initiation of coagulation. After several hours, circulation is stopped.

The resultant material obtained is a purified, undenatured blood albumin-rich product from which salts (e.g. sodium chloride, phosphate, and sulfate) are substantially removed.

EXAMPLE XIII

This example illustrates a further embodiment of the method of the invention wherein a heat-sensitive gel is treated for ionic contaminant removal.

Fresh animal hide initially is limed according to the procedure of Example I of U.S. Pat. No. 3,408,918, hair is removed from the limed hide, and then, without neutralization and while maintaining the material at a temperature on the order of 0-5° C. the resultant mass is defleshed, split, cut into small pieces, e.g. squares 0.25-4 in. on a side, and finally ground to provide a comminuted crude collagen product containing approximately 2.0-2.5% calcium, calculated as calcium oxide, total weight basis.

This procedure and apparatus of Example I are used to treat the crude collagen material with the combined effects of a circulating solvent and a strong cation exchange resin (Dowex 50WX-8-hydrogen ion form), excepting an aqueous 0.05% by weight acetic acid solution is substituted as the solvent, the total volume of solvent employed is about five times the settled volume of the crude collagen material, the circulating solvent is maintained, without freezing, at a temperature in the range of about 0-5° C., and the cycle time of solvent around the system is about 10 minutes. Circulation of the aqueous acetic acid solution through the system at about 0-5° C. is continued (e.g. for 2-3 hours) until the calcium content of the collagen (calculated as CaO) is below about 1%.

The resultant collagen material obtained is a neutralized undegraded collagen product advantageously adapted for use in the production of conventional collagen products, e.g. sutures, edible casings, films, etc.

EXAMPLE XIV

This example illustrates an embodiment of the method of the invention involving treatment of an inorganic component mixture to separate ionic contaminants from a principally desired substance.

A 10% super-saturated solution of pharmaceutical grade sodium chloride is prepared in distilled water at 25° C. Gaseous hydrogen chloride is then bubbled through the concentrated sodium chloride solution to precipitate crystalline sodium chloride. Crystals formed are then removed by centrifuging. The resultant crystalline sodium chloride is essentially free of extraneous materials other than hydrogen chloride.

Using the general procedure and apparatus of Example VIII about 100 gm. of the hydrogen chloride-contaminated sodium chloride crystals are contacted in a column with solvent recirculating in the system through an anion exchange resin-containing column, the anion exchange resin being Dowex 1 (hydroxyl ion form), excepting about 500 ml. of anhydrous methanol at 25° C. is employed as the solvent. Circulation through the system is continued for about two hours.

The resultant treated crystalline sodium chloride obtained is an essentially contaminant-free product of analytical grade purity.

EXAMPLE XV

This example illustrates an embodiment of the method of the invention wherein a gaseous component mixture is treated for ionic material separation.

A gaseous stream comprising air contaminated with about 100 p.p.m. of each carbon disulfide and hydrogen sulfide is passed upwardly through a glass column similar to that used for cellulose xanthate loading in Example I, excepting the column is filled with No. 4 glass beads. Effluent from the top of the column is recycled to an inlet in the bottom of the column by an inline blower at a rate corresponding to a cycle time of about five minutes. As in Example XIV, the component mixture-containing column (gas column here) is connected to an anion exchange resin-containing column (containing Dowex 1-hydroxyl ion form) and 500 ml. of methanol is circulated at about 25° C. and a flow rate of about 100 ml./min. in the loop containing the two columns, solvent flow direction being downward in the column through which the gas stream is passing. Circulation and contacting of the stream is continued for about one hour. The resultant treated gas composition obtained has a total sulfur-containing compound level of less than about 25 p.p.m.

Other embodiments which do not depart from the spirit and scope of the present invention, of course, will be apparent to those skilled in the art. Accordingly, it will be understood the present invention is to be limited only by the scope of the appended claims.

What is claimed is:

1. A process for separating ionic material from a mixture of components containing at least one ionic substance comprising:
   (1) contacting said component mixture with a solvent liquid to dissolve and separate ionic material from said component mixture,
   (2) separating said solvent liquid from said contacted component mixture before the ionic material concentration in said solvent liquid reaches equilibrium,
   (3) contacting resultant ionic material-containing solvent liquid with at least one immiscible ion-exchange medium to effect removal of ionic material from said solvent liquid,
   (4) contacting additional or the same component mixture with the resultant ion-exchange solvent liquid, and
   (5) thereafter again separating said solvent liquid from said contacted component mixture before the ionic material concentration in said solvent liquid reaches equilibrium.

2. The process according to claim 1 wherein said solvent liquid and components of said component mixture other than the ionic material separated by said solvent liquid are essentially immiscible.

3. The process according to claim 1 wherein ion-exchanged solvent liquid contains non-solvent extraneous material and at least a partial separation of said non-solvent extraneous material from said ion-exchanged solvent is carried out.

4. The process according to claim 1 wherein at least one soluble compound is supplementally added and dissolved in said solvent liquid, said supplementally added material providing anions of a weak acid wherein said ion-exchange medium has cation exchange capacity and cations of a weak base wherein said ion-exchange medium has anion exchange capacity.

5. The process according to claim 1 wherein said component mixture constitutes an impure polymeric alcohol xanthate containing alkaline impurities.

6. The process according to claim 5 wherein said impure polymeric alcohol xanthate is alkali cellulose xanthate in the form of a comminuted alkali cellulose xanthate crumb.

7. The process according to claim 1 wherein during said contacting of said component mixture and solvent liquid at least one of said component mixtures and said solvent liquid is passed continuously through the zone in which contacting occurs.

8. The process according to claim 7 wherein ion-exchanged solvent liquid is recirculated to re-contact component mixture from which ionic material previously has been separated thereby.

9. The process according to claim 7 wherein said solvent liquid and components of said component mixture other than the ionic material separated by said solvent liquid are essentially immiscible.

10. The process according to claim 7 wherein ion-exchanged solvent liquid contains non-solvent extraneous material and at least a partial separation of said non-solvent extraneous material from said ion-exchanged solvent is carried out.

11. The process according to claim 7 wherein at least one soluble compound is supplementally added and dissolved in said solvent liquid, said supplementally added material providing anions of a weak acid wherein said ion-exchange medium has cation exchange capacity and cations of a weak base wherein said ion-exchange medium has anion exchange capacity.

12. The process according to claim 7 wherein said component mixture constitutes an impure polymeric alcohol xanthate containing alkaline impurities.

13. The process according to claim 7 wherein said impure polymeric alcohol xanthate is alkali cellulose xanthate in the form of a comminuted alkali cullulose xanthate crumb.

14. The process according to claim 1 wherein ion-exchanged solvent liquid is recirculated to re-contact component mixture from which ionic material previously has been separated thereby.

15. The process according to claim 14 wherein said component mixture constitutes an impure polymeric alcohol xanthate containing alkaline impurities.

16. The process according to claim 14 wherein said impure polymeric alcohol xanthate is alkali cellulose xanthate in the form of a comminuted alkali cellulose xanthate crumb.

17. The process according to claim 14 wherein ion-exchanged solvent liquid contains non-solvent extraneous material and at least a partial separation of said non-solvent extraneous material from said ion-exchanged solvent is carried out.

18. The process according to claim 14 wherein at least one soluble compound is supplementally added and dissolved in said solvent liquid, said supplementally added material providing anions of a weak acid wherein said ion-exchange medium has cation exchange capacity and cations of a weak base wherein said ion-exchange medium has anion exchange capacity.

19. The process according to claim 18 wherein said component mixture constitutes an impure polymeric alcohol xanthate containing alkaline impurities.

20. The process according to claim 19 wherein said impure polymeric alcohol xanthate is alkali cellulose xanthate in the form of a comminuted alkali cellulose xanthate crumb.

21. The process according to claim 14 wherein said solvent liquid and components of said component mixture other than the ionic material separated by said solvent liquid are essentially immiscible.

22. The process according to claim 21 wherein at least one soluble compound is supplementally added and dissolved in said solvent liquid, said supplementally added material providing anions of a weak acid wherein said ion-exchange medium has cation exchange capacity and cations of a weak base wherein said ion-exchange medium has anion exchange capacity.

23. The process according to claim 22 wherein said component mixture constitutes an impure polymeric alcohol xanthate containing alkaline impurities.

24. The process according to claim 23 wherein said impure polymeric alcohol xanthate is alkali cellulose xanthate in the form of a comminuted alkali cellulose xanthate crumb.

25. The process of claim 14 wherein said component mixture constitutes lime-containing collagen.

26. The process of claim 14 wherein said component mixture constitutes a temperature-sensitive substance contaminated with an ionic impurity and said contacting of said component mixture and said solvent liquid is carried out at a temperature at which said temperature-sensitive substance is stable.

27. The process of claim 14 wherein the temperature of said solvent liquid is maintained below about 40° C.

28. The process of claim 27 wherein said solvent liquid is unstable above 40° C.

29. The process of claim 27 wherein said temperature is below about 0° C.

30. The process of claim 14 wherein said component mixture constitutes an acid-sensitive substance contaminated with alkaline impurities and said ion-exchange medium has cation exchange capacity.

31. The process of claim 14 wherein said component mixture constitutes an alkali-sensitive substance contaminated with acidic impurities and said ion-exchange medium has anion exchange capacity.

32. The process of claim 14 wherein said ionic material separated from said component mixture has a solubility at 25° C. of less than about 1% in said solvent liquid.

33. The process of claim 14 wherein said solvent liquid has a normal boiling point of above about 100° C.

34. The process of claim 14 wherein the total volume of said solvent liquid employed to separate ionic material from said component mixture is less than the minimum total volume theoretically required to simultaneously dissolve the amount of said separated ionic material.

35. The process of claim 14 wherein the concentration of said ionic material in the resultant treated component mixture is below about 50 p.p.m.

References Cited

UNITED STATES PATENTS

| | | | |
|---|---|---|---|
| 1,996,197 | 4/1935 | Freund | 260—218 |
| 2,985,636 | 5/1961 | Anselm et al. | 260—91.3 |
| 2,122,188 | 6/1938 | Vollrath | 260—217 |
| 2,331,936 | 10/1943 | Schlosser et al. | 260—217 |
| 3,050,508 | 8/1962 | Starck et al. | 260—91.3 |
| 3,291,789 | 12/1966 | Bridgeford | 260—217 |
| 3,330,820 | 7/1967 | Bridgeford | 260—218 |
| 3,458,436 | 7/1969 | Martinola et al. | 210—20 |

FOREIGN PATENTS

| | | | |
|---|---|---|---|
| 60,817 | 11/1922 | Sweden | 260—218 |

DONALD E. CZAJA, Primary Examiner

R. W. GRIFFIN, Assistant Examiner

U.S. Cl. X.R.

210—263; 260—91.3, 96, 118, 120, 122, 232